(12) United States Patent
Melamed

(10) Patent No.: US 8,511,180 B2
(45) Date of Patent: Aug. 20, 2013

(54) PRESSURE DIFFERENCE FLOWMETER WITH FLOW BARRIER BETWEEN A CONDUIT AND A REFERENCE TUBE

(75) Inventor: Ofer Melamed, Rehovot (IL)

(73) Assignee: Ofer Melamed, Rehovot (IL)

( * ) Notice: Subject to any disclaimer, the term of this patent is extended or adjusted under 35 U.S.C. 154(b) by 262 days.

(21) Appl. No.: 12/874,935

(22) Filed: Sep. 2, 2010

(65) Prior Publication Data
US 2012/0055265 A1 Mar. 8, 2012

(51) Int. Cl.
*G01F 1/38* (2006.01)

(52) U.S. Cl.
USPC .................. 73/861.47; 73/861.52; 73/861.63

(58) Field of Classification Search
None
See application file for complete search history.

(56) References Cited

U.S. PATENT DOCUMENTS

| | | | |
|---|---|---|---|
| 2,667,786 A | 2/1954 | Spaulding | |
| 3,600,945 A * | 8/1971 | Wenzel et al. | 73/861.52 |
| 3,693,437 A | 9/1972 | Shiba | |
| 3,838,599 A * | 10/1974 | Purtell | 73/861.49 |
| 3,924,467 A | 12/1975 | Takamura | |
| 3,993,939 A | 11/1976 | Slavin et al. | |
| 4,051,723 A | 10/1977 | Head et al. | |
| 4,195,522 A | 4/1980 | Anderson et al. | |
| 5,604,315 A * | 2/1997 | Briefer et al. | 73/861.49 |
| 5,827,191 A | 10/1998 | Rosenfeld | |
| 6,301,974 B1 | 10/2001 | van der Pol | |
| 6,854,340 B2 * | 2/2005 | Nestle et al. | 73/861.49 |
| 7,188,531 B1 * | 3/2007 | Feldmeier | 73/744 |
| 7,409,867 B2 * | 8/2008 | Toy et al. | 73/724 |
| 7,503,220 B2 * | 3/2009 | Sittler et al. | 73/715 |
| 7,784,353 B1 * | 8/2010 | Feldmeier | 73/744 |
| 2002/0166376 A1 | 11/2002 | Kohmura et al. | |
| 2005/0005709 A1 | 1/2005 | Schaffer et al. | |
| 2005/0177099 A1 | 8/2005 | Dahan et al. | |
| 2006/0226108 A1 | 10/2006 | Dahan et al. | |
| 2008/0039741 A1 | 2/2008 | Shemesh et al. | |
| 2008/0167579 A1 | 7/2008 | Ezra et al. | |
| 2009/0054771 A1 | 2/2009 | Kolberg et al. | |

FOREIGN PATENT DOCUMENTS
EP 0077413 A1 4/1983

* cited by examiner

*Primary Examiner* — Harshad R Patel
(74) *Attorney, Agent, or Firm* — Pearl Cohen Zedek Latzer, LLP

(57) ABSTRACT

A flowmeter device for measuring a flow rate of a fluid includes a conduit for the fluid flow. The conduit is characterized by a cross-sectional area and includes at least one section within which the cross-sectional area is different from the cross-sectional area of at least one other section of the conduit. The device also includes a reference tube separated from the conduit by a wall and at least one opening in the wall between the section and the reference tube. The device includes a flexible diaphragm forming a space between the diaphragm and a region of the wall at the section of the conduit, and which includes the opening, to inhibit flow of the fluid between the conduit and the reference tube. The diaphragm is deformable so as to allow measuring a parameter associated with the deformation of the diaphragm in response to a difference between fluid pressure in section and fluid pressure in the reference tube in fluid pressure between a fluid flowing through the section of the conduit and a fluid contained in the reference tube.

21 Claims, 18 Drawing Sheets

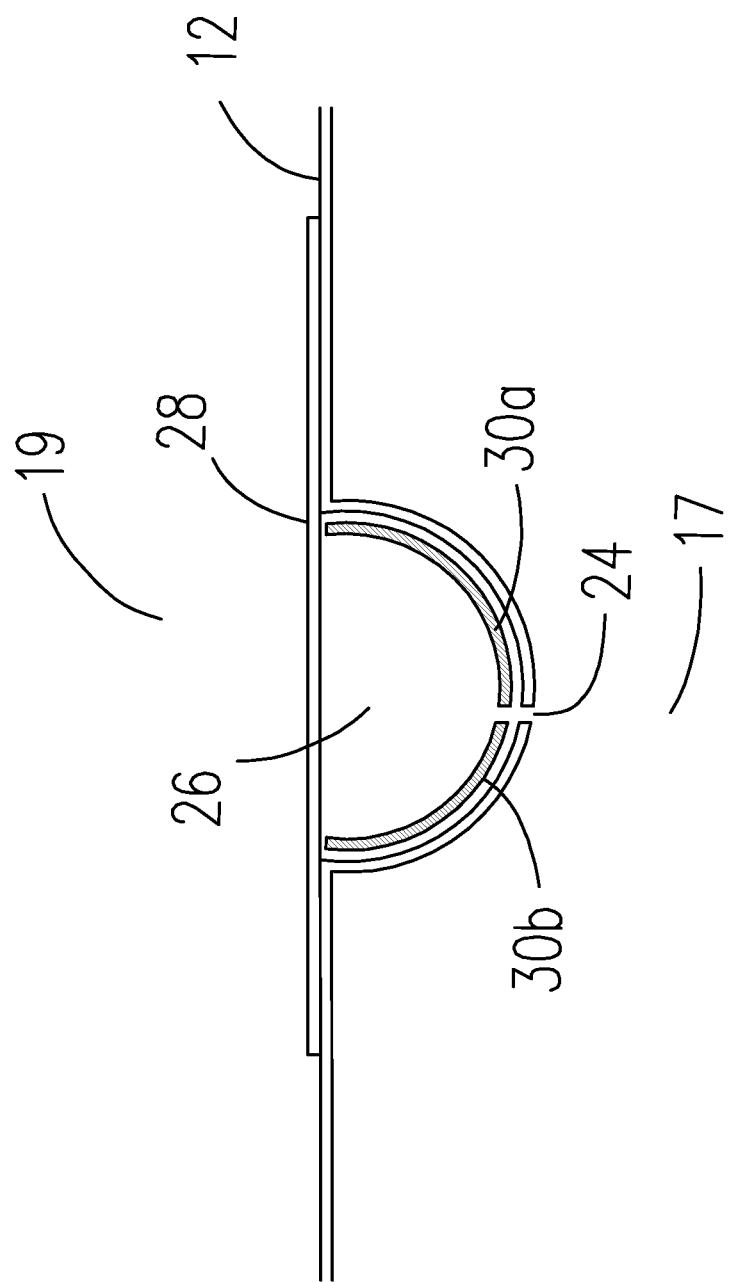

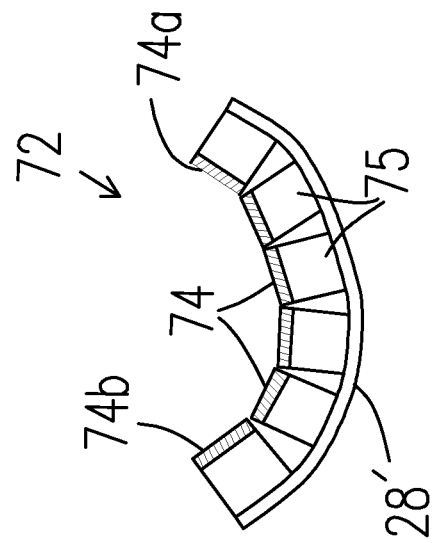
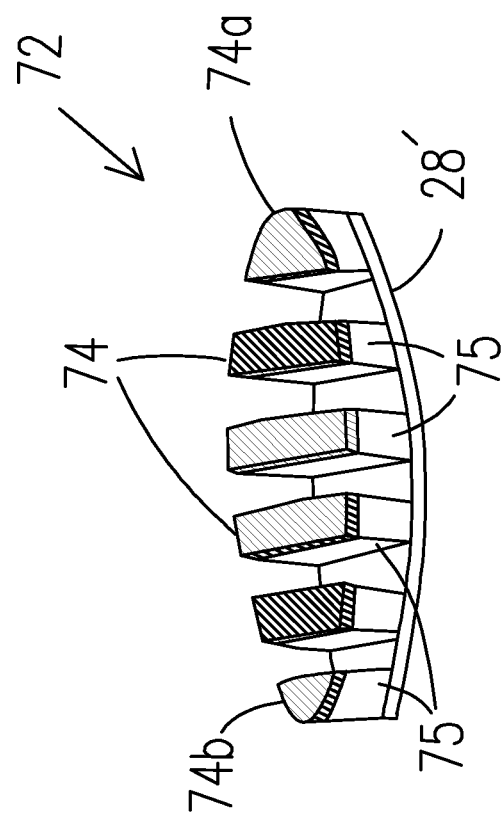

PRESSURE DIFFERENCE FLOWMETER WITH FLOW BARRIER BETWEEN A CONDUIT AND A REFERENCE TUBE

FIELD OF THE INVENTION

The present invention relates to flowmeters. More particularly, the present invention relates to a flowmeter based on pressure differences induced in a flowing fluid.

BACKGROUND OF THE INVENTION

Knowledge of the volume of fluid (such as a liquid, gas, or any other form of matter capable of flowing in accordance with principles of fluid dynamics) that flows from a source to a destination is desirable and advantageous in many applications. In many cases, the volume of fluid in a destination container may be directly measurable using standard fluid volume measurement techniques. For example, a container at the destination may be provided with a window through which the level of the fluid is visible. A window, dipstick, or container surface may include graduation marks for quantitatively indicating the fluid level in the container. A float or sensor may cooperate with an indicator to indicate the level of fluid in the container. If the dimensions of the destination container are known, or if the graduation marks or indicator have been calibrated, the volume of fluid in the destination container may be inferred. Measuring the volume of fluid in the destination container before and after the flow indicates the volume of fluid that flowed from source to volume.

In some cases, the volume of fluid at the destination cannot be measured directly. For example, there may not be access to fluid at the destination. As another example, or fluid may flow out of the destination container concurrently with the inflow of fluid from the source, or concurrently flow into the destination from another source. In some such cases, the volume of fluid flowing from the source into the destination may be deduced from a change of the volume of fluid in the source. For example, flow of fluid may be limited to a conduit that connects the source to the destination. Thus, a reduction in a measured volume of fluid in a source container may indicate that a similar volume of fluid has flowed into the destination.

In some applications, neither the volume of fluid flowing out of the source nor the volume of fluid arriving at the destination is directly measurable. For example, direct access to the fluid at the source may not be possible. If the fluid in the source is replenished or flows outward to another destination concurrently with flow from the source to the destination, the amount of flow from the source to the destination may not be deduced from the change in fluid volume at the source.

In some cases, therefore, the volume of fluid flowing from the source to the destination may be deduced from a measured flow between the source and the destination. For example, a conduit connection the source to the destination may include a flowmeter. A flowmeter may indicate the rate of flow of the fluid past a point of the conduit as a volume of fluid per unit time. Integrating the flow rate over a period of time yields the volume that flowed past the flowmeter during that period of time.

A rate of flow may refer to any of several related quantities. For example, a rate of flow may refer to a velocity of a fluid (e.g. displacement of a volume of the fluid per unit time) or to a mass or volume of fluid flowing past a given point or plane per unit time.

Flowmeters have been designed for different circumstances and are based on various principles. For example, various flowmeters have been described that are based on the flowing fluid exerting a mechanical force on an object (e.g. by Head et al. in U.S. Pat. No. 4,051,723 and Anderson et al. in U.S. Pat. No. 4,195,522), on Coriolis forces in the fluid (e.g. van der Pol et al. in U.S. Pat. No. 6,301,974), on electrical properties of the flowing fluid (e.g. Rottenberg et al. in EP 0077413), and on ultrasound (e.g. Schaffer et al. in US 2005/005709).

Flowmeters have been described that are based on induced pressure differences within the fluid. For example, a pressure difference may be introduced in a flowing fluid by a constriction in part of the conduit through which the fluid is flowing. Examples of flowmeters based on pressure differences include Venturi tubes and pipes with orifices. Such a pressure difference may be a function of the flow rate of the fluid. One or more pressure gauges may measure the pressure or pressure differences. A flow rate may then be deduced from the measured pressures. For example, at a point in the conduit, part of the fluid may be directed through a Venturi tube while part of the liquid bypasses the Venturi tube (e.g. Takamura et al. in U.S. Pat. No. 3,924,467, Kohmura et al. in US 2002/166376, and Shiba in U.S. Pat. No. 3,693,437).

Different types of pressure gauges have been described for measuring the pressure of a fluid. For example, pressure gauges have been described in which a diaphragm or membrane is moved by differing pressures on either side of it. For example, one side of the diaphragm may be exposed to a fluid whose pressure is to be measured, and the other to a fluid at a reference pressure. The diaphragm or other components of the diaphragm pressure gauge may be connected to a suitable electrical circuit. Motion of the membrane under the influence of the pressure difference may be sensed as a change in capacitance (e.g. as described by Spaulding in U.S. Pat. No. 2,667,786 or by Slavin et al. in U.S. Pat. No. 3,993,939).

For example, it may be desirable to know the milk intake of a child during breastfeeding. In this case, direct measurement of the volume of milk taken in by the child or the volume of milk output by the breast, may be difficult. Therefore, devices have been described for measuring or estimating the milk intake. For example, a device for measuring the flow rate of milk using Doppler ultrasound may be placed around the breast during breastfeeding (e.g. as described by Kolberg et al. in US 2009/054771). Other described devices include a cap through which milk may flow may be placed over the nipple during breastfeeding. For example, a cap that covers the nipple may divert some of the milk flowing through it to an indicator whose level is related to the volume of the milk that flowed through the cap (e.g. as described by Dahan et al. in US 2005/177099 and in US 2006/226108). Nipple caps have also been described that measure the flow rate or volume of milk passing through them using various techniques (e.g. by Rosenfeld in U.S. Pat. No. 5,827,191, Ezra et al. in US 2008/167579, and Shemesh et al. in US 2008/039741).

It is an object of the present invention to provide a flowmeter for measuring the flow of a fluid, applicable to a variety of flow applications.

Other aims and advantages of the present invention will become apparent after reading the present invention and reviewing the accompanying drawings.

SUMMARY OF THE INVENTION

There is thus provided, in accordance with some embodiments of the present invention, a flowmeter device for measuring a flow rate of a fluid. The device includes a conduit for the fluid flow, the conduit being characterized by a cross-sectional area, the conduit including at least one section within which the cross-sectional area is different from the cross-sectional area of at least one other section of the conduit. The device further includes a reference tube separated from the conduit by a wall; at least one opening in the wall between said at least one section and the reference tube; and a flexible diaphragm forming a space between the diaphragm and a region of the wall at the section, which includes the opening, to inhibit flow of the fluid between the conduit and the reference tube, the diaphragm being deformable so as to allow measuring a parameter associated with the deformation of the diaphragm in response to a difference between fluid pressure in the section and fluid pressure in the reference tube.

Furthermore, in accordance with some embodiments of the present invention, the section includes a constriction.

Furthermore, in accordance with some embodiments of the present invention, the constriction includes an indentation on a side of the conduit.

Furthermore, in accordance with some embodiments of the present invention, the constriction extends circumferentially about the conduit.

Furthermore, in accordance with some embodiments of the present invention, the diaphragm includes a sleeve that surrounds the constriction.

Furthermore, in accordance with some embodiments of the present invention, the section is provided with at least one electrode.

Furthermore, in accordance with some embodiments of the present invention, the electrode includes at least two electrodes, and the measurable parameter is electrical resistance between the electrodes.

Furthermore, in accordance with some embodiments of the present invention, the device includes a Wheatstone bridge circuit for measuring the electrical resistance.

Furthermore, in accordance with some embodiments of the present invention, the measurable parameter is electrical capacitance of a capacitor at least partially formed by the diaphragm and said at least one electrode.

Furthermore, in accordance with some embodiments of the present invention, the reference tube is adjacent to the conduit.

Furthermore, in accordance with some embodiments of the present invention, the reference tube at least partially surrounds the conduit.

Furthermore, in accordance with some embodiments of the present invention, the reference tube includes an external opening.

Furthermore, in accordance with some embodiments of the present invention, the reference tube includes at least two external openings to enable a fluid to flow through the reference tube.

Furthermore, in accordance with some embodiments of the present invention, the diaphragm includes at least two electrically conducting caps, wherein electrical contact between at least two of the electrically conducting caps depends on the shape of the diaphragm.

Furthermore, in accordance with some embodiments of the present invention, the electrically conducting caps are arranged in a parallel strip pattern.

Furthermore, in accordance with some embodiments of the present invention, the electrically conducting caps are arranged in a two-dimensional array pattern.

Furthermore, in accordance with some embodiments of the present invention, the device is incorporated into a artificial nipple of a breastfeeding monitor apparatus.

Furthermore, in accordance with some embodiments of the present invention, the device includes a measuring device for measuring the parameter.

Furthermore, in accordance with some embodiments of the present invention, the conduit includes a flow cutoff valve.

There is further provided, in accordance with some embodiments of the present invention, a device for measuring a flow rate of a fluid. The device includes a conduit for the fluid flow, the conduit being characterized by a cross-sectional area, the conduit including at least one section within which the cross-sectional area is different from the cross-sectional area of at least one other section of the conduit. The device further includes a container capable of containing a fluid; at least one fluid passageway between the section and the container; a barrier for inhibiting flow of fluid through the passageway, at least a part of the barrier being moveable in response to a difference between fluid pressure of a fluid flowing through the section and fluid pressure in the container so as to enable a transfer of fluid between the conduit and the container; and a measuring apparatus for measuring a volume of fluid contained in the container.

Furthermore, in accordance with some embodiments of the present invention, the container includes a one-way valve configured to enable a fluid to flow in a single direction either into or out of the container.

There is further provided, in accordance with some embodiments of the present invention, a device for measuring a flow rate of a fluid. The device includes a conduit for the fluid flow, the conduit being characterized by a cross-sectional area, the conduit including at least one section within which the cross-sectional area is different from the cross-sectional area of at least one other section of the conduit. The device also includes a reference tube; at least one fluid passageway between the section and the reference tube; an indicator configured to inhibit flow of fluid through the passageway, the indicator being moveable in response to a difference between fluid pressure of a fluid flowing through the section and fluid pressure in the reference tube; and a measuring apparatus for measuring a position of the indicator along the passageway.

Furthermore, in accordance with some embodiments of the present invention, the passageway includes an elastic tube.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 2A shows a diaphragm and constricting indentation of the flowmeter shown in FIG. 1B, when the flow rate is close to zero.

FIG. 4A shows a diagram of a diaphragm of a binary flowmeter when the flow rate is less than a threshold level, in accordance with some embodiments of the present invention.

FIG. 4B shows a cross section of the diaphragm shown in FIG. 4A when the flow rate is greater than the threshold value.

DETAILED DESCRIPTION OF EMBODIMENTS

Figure 1A:
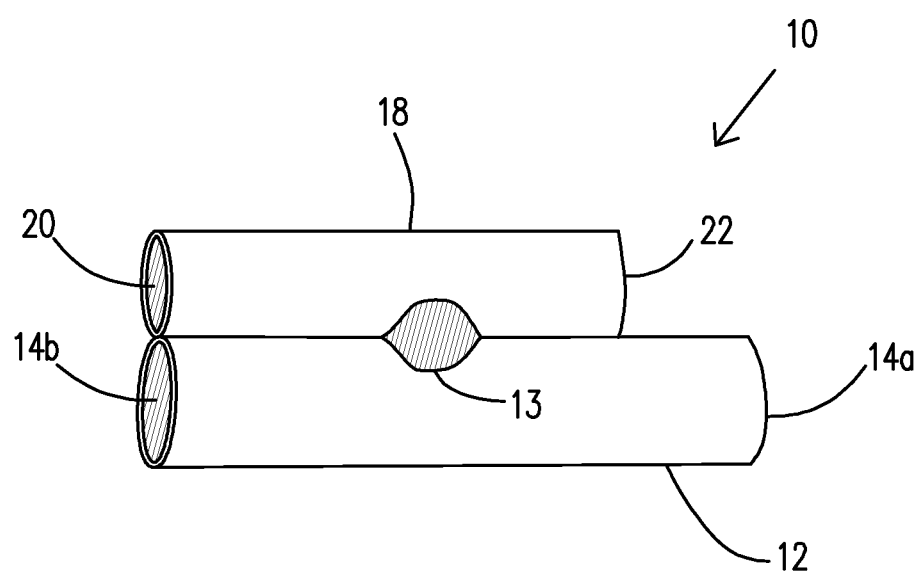
FIG. 1A shows a flowmeter in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

A flowmeter in accordance with embodiments of the present invention includes a conduit through which a fluid may flow. The conduit includes one or more sections in which the cross-sectional area is different from in the remainder of the conduit. In accordance with known principles of fluid dynamics, when a substantially incompressible fluid flows through such a section, fluid pressure in the section is different than fluid pressure in the remainder of the conduit. The difference in pressure is typically a function of the rate of flow of the fluid. For example, if a section is constricted with reduced cross-sectional area, fluid pressure in the constricted section is typically lower than fluid pressure in the remainder of the conduit. On the other hand, if a section is dilated with expanded cross-sectional area, fluid pressure in the dilated section is typically greater than in the remainder of the conduit.

For example, in accordance with some embodiments of the present invention, each of the section may include an indentation in the wall of the conduit. The cross-sectional area of the conduit at the indented section is less than the cross-sectional area of neighboring sections of the conduit, forming a constriction in the conduit. Thus, in accordance with the aforementioned principles of fluid dynamics, fluid pressure in the constriction may be lower than fluid pressure in a section of the conduit that is not constricted. The difference in pressure is typically a function of the rate of flow of the fluid.

The indentation includes an opening through the wall of the conduit to a space outside the walls of the conduit. Flow of fluid through the opening may be blocked by a barrier. The barrier may be configured such that at least part of the barrier is displaceable in response to an applied force. For example, the opening may be covered with a flexible and elastic diaphragm. Typically, the pressure of fluid within the outside space is approximately equal to the fluid pressure within the constriction. The barrier separates the enclosed space from a second space. The second space, hereinafter referred as a reference tube, may be typically filled with a fluid at a reference pressure that is substantially independent of the rate of flow of fluid in the conduit. For example, some of the fluid that flows through the conduit may be diverted to the reference tube.

The reference tube may be in the form of a chamber with a circular, rectangular, polygonal, or otherwise shaped cross section. The reference tube may be entirely enclosed, or may have one or more openings or open ends.

A pressure difference between fluids on either side of the barrier may result in a net force on the barrier. As a result of the net force, a moveable portion of the barrier may be displaced in response to the force. The barrier may be configured such that the amount of displacement is a function of the pressure difference. For example, the barrier may include an elastic element that applies a restoring force that depends on the amount of displacement. Thus, in the presence of a pressure difference, the moveable portion of the barrier may be displaced to an equilibrium position where the applied force and the restoring force are approximately balanced.

For example, the barrier may be in the form of a flexible diaphragm. A diaphragm covering the outside space is typically constructed of a flexible and elastic material. The diaphragm is configured so as to inhibit fluid flow. For example, the diaphragm may block flow of at least a component of a fluid. Alternatively, the diaphragm may enable a fluid to flow through it at a significantly reduced flow rate. For example, the diaphragm may be made of a material such as rubber or a flexible plastic, or of a thin metal plate or foil. The diaphragm is typically capable of bending, stretching, distending, or otherwise deforming, in response to forces applied to it. For example, if fluid pressure on one side of the diaphragm is different from pressure on the other, the diaphragm may deform so as to bulge toward the side with lower pressure. One or more measurable parameters may be associated with deformation of the diaphragm. Thus, a measurement of one of these parameters may be correlated with deformation of the diaphragm, and thus a flow rate of the fluid.

For example, the flowmeter may include a sensor for sensing bending of the diaphragm. For example, the sensor may include an appropriate mechanical, optical, or electromagnetic sensor known in the art for measuring bending of a diaphragm. For example, the diaphragm may include a partially conducting material (e.g. doped silicone), and the enclosed space may be provided with two or more electrodes. When the pressure within the enclosed space is reduced relative to the second space on the other side of the diaphragm, the diaphragm may bend inwards. As the diaphragm bends inward, part of the diaphragm may electrically contact the electrodes. The lower the pressure, and the more the diaphragm bends inward, the greater the area of contact between the diaphragm and the electrodes. Thus, electrical resistance between the electrodes may decrease as the area of contact increases. An appropriate electrical circuit connected to the electrodes, for example, a Wheatstone bridge circuit, may produce a signal indicating the resistance. The signal may thus indicate the area of contact with the diaphragm, which in turn may indicate fluid pressure within the enclosed space, in turn indicating the rate of fluid flow in the conduit.

Reference is now to the accompanying Figures.

FIG. 1A shows a flowmeter in accordance with some embodiments of the present invention. Flowmeter 10 includes fluid conduit tube 12 and an adjacent reference tube 18. Fluid conduit tube 12 may be connected between a fluid input source and a fluid output cavity. For example, open end 14a of fluid conduit tube 12 may be connected to an input source, and open end 14b may be connected to an output cavity, or vice versa. Fluid conduit tube 12 and reference tube 18 attach to one another at least at enclosed space 13.

Reference tube 18 includes external opening 20. Typically, end 22 of reference tube 18 is closed. Typically, when open end 14b of fluid conduit tube 12 is connected to a fluid output cavity, external opening 20 of reference tube 18 is open to the same output cavity. In this manner, fluid pressure within reference tube 18 is approximately equal to the fluid pressure in the output cavity. Similarly, if open end 14b of fluid conduit tube 12 is connected to a fluid input source, external opening 20 of reference tube 18 is open to the same input source.

Alternatively, open end 14b of fluid conduit tube 12 and external opening 20 of reference tube 18 may be open to different spaces. For example, open end 14b and external opening 20 may connect to different compartments of a container. For example, the compartments of the container may be divided by a wall or membrane. For example, the fluid contents of the various compartments may differ from one another. For example, the compartments may contain different solutions with different concentrations of a solute.

Figure 1B:
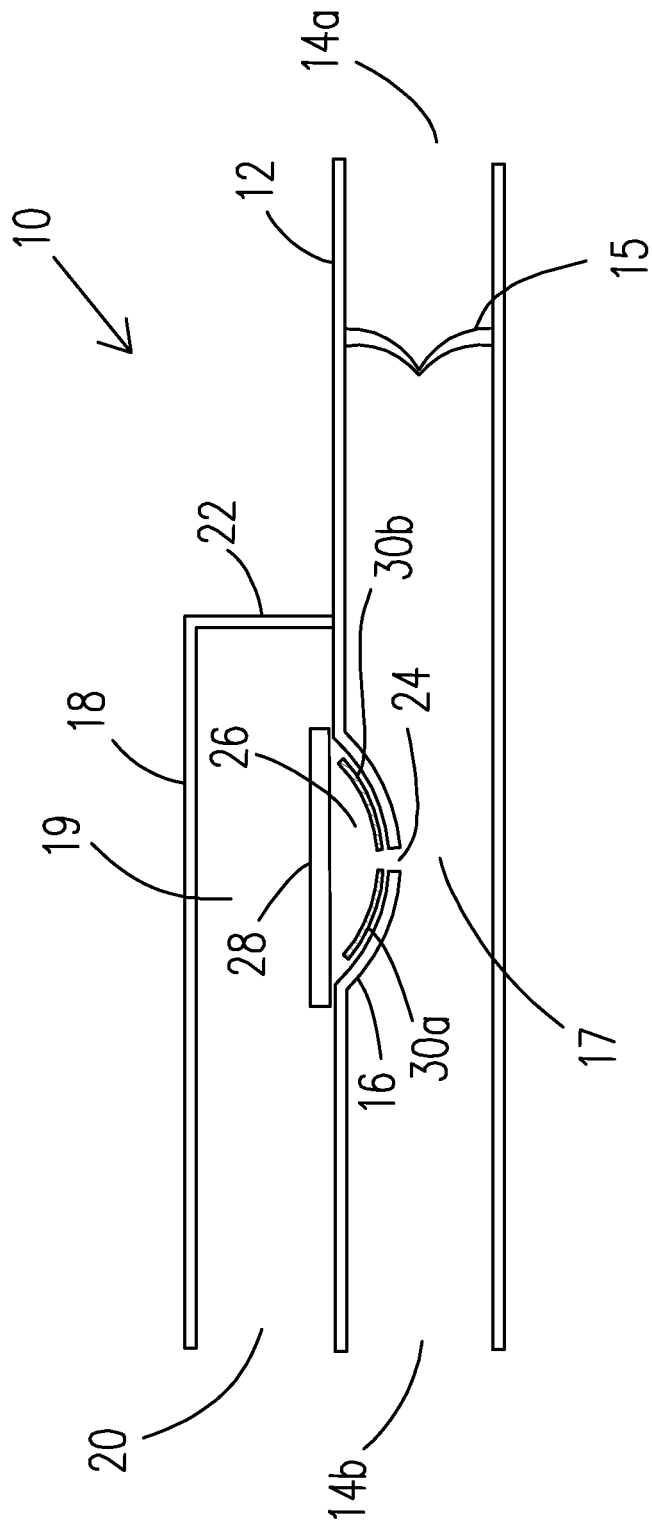
FIG. 1B shows a cross section along the plane of symmetry of the flowmeter shown in FIG. 1A.

FIG. 1B shows a cross section along the plane of symmetry of the flowmeter shown in FIG. 1A. Constricting indentation 16 of fluid conduit tube 12 includes hole 24. Constricting indentation 16 may be located within enclosed space 13 (FIG. 1A). Hole 24 connects the interior of fluid conduit tube 12 to indentation cavity 26. Alternatively to a single hole 24, fluid conduit tube 12 and indentation cavity 26 may be connected by a plurality of holes. The various holes may differ from one another in size and location. For example, the cross-sectional area of fluid conduit tube at one hole, and thus fluid pressure at that hole, may be different from that at another hole. Thus, fluid pressure in indentation cavity 26 may result from a combination of the fluid pressures at the various holes.

Indentation cavity 26 is separated from the interior reference space 19 of reference tube 18 by diaphragm 28. Typically, diaphragm 28 is constructed of a flexible elastic material that includes material that is at least partially electrically conducting. For example, diaphragm 28 may include conducting silicone. Constricting indentation 16 forms constricted neck 17 in fluid conduit tube 12.

Fluid conduit tube 12, in accordance with some embodiments of the present invention, may include flow cutoff valve 15. For example, flowmeter 10 may be optimized for measurement of a rate of flow within a predetermined range. Therefore, providing fluid conduit tube 12 flow cutoff valve 15 may prevent flow when the fluid flow rate deviates from the predetermined range. For example, flow cutoff valve 15 may include an inline mechanical valve that is configured to be opened by the fluid pressure of the fluid when the flow rate exceeds a predetermined value.

Figure 1C:
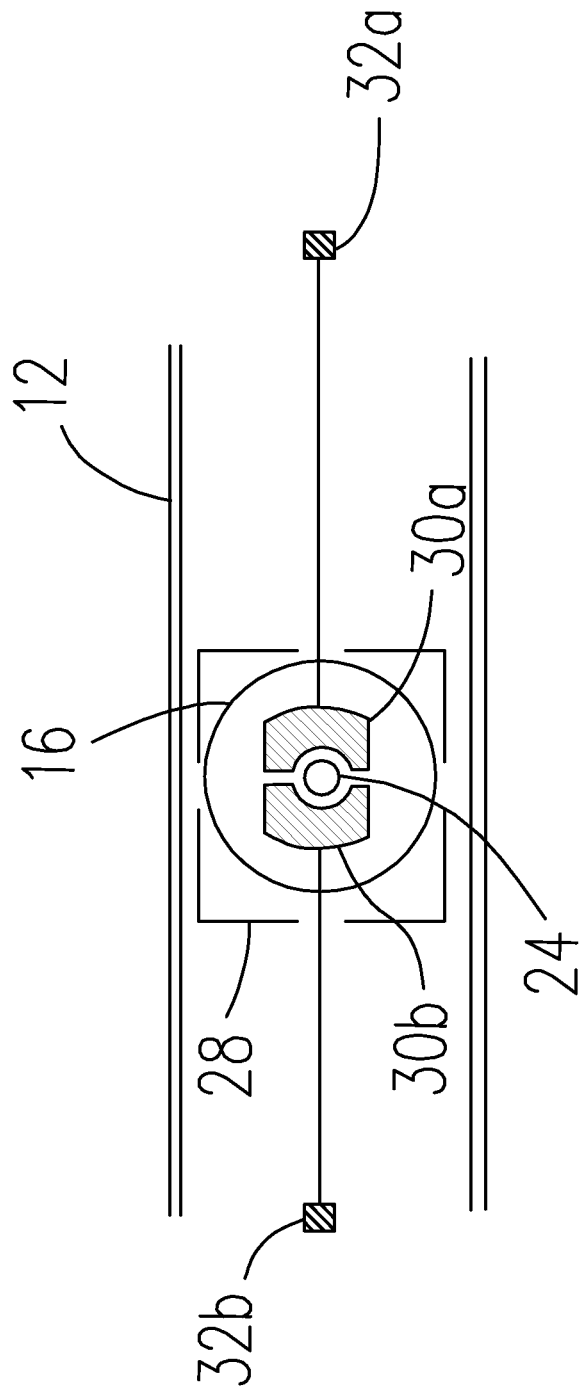
FIG. 1C shows a top view of a constricting indentation of a fluid conduit tube of the flowmeter shown in FIG. 1B, viewed from the direction of a reference tube of the flowmeter.

FIG. 1C shows a constricting indentation of a fluid conduit tube of the flowmeter shown in FIG. 1B, viewed from the direction of a reference tube of the flowmeter. For illustration purposes, diaphragm 28 is shown as transparent so as to enable illustration of structure behind diaphragm 28. However, diaphragm 28 may be opaque, translucent, or transparent. An outward-facing surface (facing indentation cavity 26) of constricting indentation 16 in the vicinity hole 24 includes one or more electrodes, such as electrodes 30a and 30b, positioned on the outward-facing surface. For example, electrodes 30a and 30b may be mounted to the outward-facing surface of constricting indentation 16. Electrode 30a may be in electrical contact with electrical connector 32a, and electrode 30b may be in electrical contact with electrical connector 32b. Electrodes 30a and 30b may be electrically isolated from one another or may be electrically connected via diaphragm 28. The electrical resistance of the electrical connection may vary, as described below.

For example, a fluid may flow through fluid conduit tube 12 from open end 14a to open end 14b, or vice versa. Typically, the flow velocity (in units of distance per time) of the fluid in constricted neck 17 of fluid conduit tube 12 is greater than the flow velocity through the remainder of fluid conduit tube 12. For example, fluid pressure of an approximately incompressible fluid (such as a liquid) that flows through a constriction of a conduit may be determined in accordance with principles of fluid dynamics. Such principles may include, for example, continuity of mass, Bernoulli's principle, and the Venturi effect. In accordance with these principles, when fluid flows with a nonzero flow rate through fluid conduit tube 12, fluid pressure in a constricted neck 17 formed by constricting indentation 16 is typically lower than fluid pressure in a section of fluid conduit tube 12 with greater cross-sectional area. Fluid pressure in interior reference space 19 is approximately equal to fluid pressure at open end 14b of fluid conduit tube 12. Thus, depending on the direction of flow, fluid pressure in interior reference space 19 may be equal to fluid pressure in a fluid input source or output cavity.

Fluid in indentation cavity 26 is connected to fluid in constricted neck 17 of fluid conduit tube 12 via hole 24. Thus, fluid pressure in indentation cavity 26 is approximately equal to fluid pressure in outward-facing. Thus, when fluid flows through fluid conduit tube 12, fluid pressure of fluid in indentation cavity 26 may typically be lower than of fluid in interior reference space 19.

In accordance with the aforementioned principles of fluid mechanics, the difference in fluid pressure between fluid in indentation cavity 26 and fluid in interior reference space 19 increases with increasing flow rate. Diaphragm 28 is subject to a distending force that is a function of the difference in fluid pressure between fluid in indentation cavity 26 and fluid in interior reference space 19. Thus, when fluid flows through fluid conduit tube 12 with a nonzero flow rate, the greater pressure in interior reference space 19 tends to bend diaphragm 28 so as to bulge into indentation cavity 26.

In addition, the distending force may be a function of additional factors. For example, diaphragm 28 may be permeable to one component of a fluid, for example a solvent, and impermeable to another component, for example a solute. In this case the distending force may also depend on the difference between the concentrations of the solution on either side of diaphragm 28. Other factors may also effect the distending force on, or the magnitude of a result bulging of, diaphragm 28. Such factors may include, for example, fluidic properties of the fluid or fluids (e.g. density, viscosity, and thermal expansion factor), height differences, chemical environment, or a temperature.

A pump or other pressure inducing device may be applied to increase or decrease fluid pressure in fluid conduit tube 12 or in reference tube 18. In this manner, a bias pressure is introduced that may be substantially independent of fluid flow. For example, decreasing fluid pressure in fluid conduit tube 12 may reduce a minimum flow rate that is measurable with the flowmeter.

FIG. 2A shows a diaphragm of the flowmeter shown in FIG. 1B, when the flow rate is close to zero. Fluid pressure in indentation cavity 26 is approximately equal to pressure in interior reference space 19. Therefore, diaphragm 28 is not bent. Electrode 30a is not in electrical contact with electrode 30b, or electrical contact is minimal.

Figure 2B:
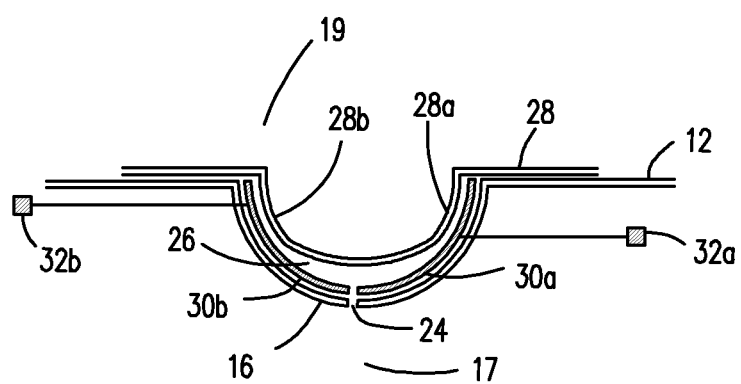
FIG. 2B shows the diaphragm of FIG. 2A when the flow rate is greater than zero.

FIG. 2B shows the diaphragm of FIG. 2A when the flow rate is greater than zero. As described above, due to the nonzero rate of flow of fluid through fluid conduit 12, the pressure of fluid in interior reference space 19 is greater than the pressure of fluid in indentation cavity 26. Therefore, the excess pressure in interior reference space 19 distends diaphragm 28 to extend into indentation cavity 26. As diaphragm 28 is pushed into indentation cavity 26, section 28a of diaphragm 28 comes into contact with electrode 30a. Similarly, section 28b of diaphragm 28 comes into contact with electrode 30b. Since diaphragm 28 is at least partially conducting, diaphragm 28 forms an electrical connection between electrode 30a and electrode 30b. The electrical connection between electrode 30a and electrode 30b has an equivalent resistance value, Re, that may affect currents and voltages in a circuit to which electrodes 30a and 30b are connected (via electrical connectors 32a and 32b). Typically, diaphragm 28 may be characterized by an electrical resistivity (e.g. in units of ohm-meters) or conductivity. In this case, equivalent electrical resistance Re of the electrical connection may depend on the area of contact between electrode 30a and section 28a of diaphragm 28, and similarly on the area of contact between electrode 30b and section 28b. Typically, as either area of contact increases, equivalent electrical resistance Re of the electrical connection decreases. Thus, equivalent electrical resistance Re may be a function of the rate of fluid flow through fluid conduit tube 12. Typically, equivalent electrical resistance Re decreases as the flow rate increases.

Figure 3:
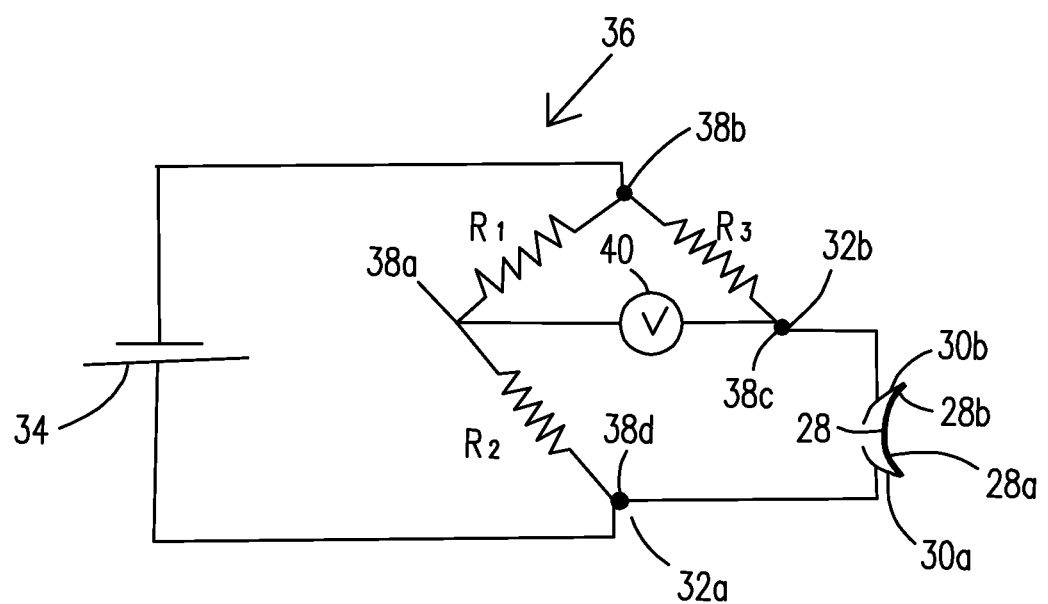
FIG. 3 schematically illustrates a measurement circuit for measuring electrical resistance between electrodes the flowmeter shown in FIG. 1B, in accordance with some embodiments of the present invention.

Equivalent electrical resistance Re of the electrical connection between electrodes 30a and 30b may be measured by connecting electrical connectors 32a and 32b to an appropriate electrical circuit. For example, a Wheatstone bridge circuit may be provided for measuring equivalent resistance Re. FIG. 3 schematically illustrates a measurement circuit for measuring electrical resistance between electrodes the flowmeter shown in FIG. 1B, in accordance with some embodiments of the present invention. Wheatstone bridge circuit 36 includes an electrical power source 34. Electrical power source 36 connects to points 38b and 38d of Wheatstone bridge circuit 36. Wheatstone bridge circuit 36 includes resistors R1, R2, and R3 whose electrical resistances are known. Resistors R1, R2, and R3 may be either known fixed resistances, or adjustable resistances. Electrical connector 32a connects to point 38d, and electrical connector 32b to point 38c, of Wheatstone bridge circuit 36. Thus, equivalent resistance Re of the electrical connection between electrodes 30a and 30b serves as the fourth resistor of Wheatstone bridge circuit 36. Voltmeter 40 connects between points 38a and 38c of Wheatstone bridge circuit 36.

Wheatstone bridge circuit 36 may be used to determine the value of equivalent resistance Re. For example, if the output voltage of electrical power source 34 is Vs, and the voltage measured by voltmeter 40 is Vm, then the value of equivalent resistance Re may be derived from the equation:

$$\frac{Vm}{Vs} = \frac{Re}{R3+Re} - \frac{R2}{R1+R3}$$

The value of Re may then be interpreted to yield a flow rate. For example, flowmeter 10 may be calibrated by operating flowmeter 10 under known conditions. The flow rate may be measured using standard flow measurement techniques (e.g. time required to fill a container of known volume). Each measured flow rate may then be correlated with a measured equivalent resistance Re to serve as correlation points. Since the relation between change in pressure and flow rate may depend on fluidic properties of a particular fluid (e.g. density and compressibility), a calibration performed with a particular flowing fluid may be valid only with respect to that fluid. Typically, flowmeter 10 may require a separate calibration for each type of fluid with it is to be used.

A flowmeter in accordance with some embodiments of the present invention may be configured to indicate two or more discrete flow rates. For example, a binary flowmeter may be configured to indicate whether a flow rate is greater than or less than a threshold level. For example, a diaphragm of a binary flowmeter may have only two conducting states: conducting or non-conducting. For example, the conducting state may indicate a flow rate greater than the threshold level, while the non-conducting state indicates a flow less than the threshold level.

FIG. 4A shows a diaphragm of a binary flowmeter when the flow rate is less than a threshold level, in accordance with some embodiments of the present invention. For example, binary diaphragm 72 may be included in a flowmeter in accordance with some embodiments of the present invention. For example, binary diaphragm 72 may replace diaphragm 28 of flowmeter 10 (shown, for example, in FIG. 1B).

Binary diaphragm 72 includes two or more raised extensions 75 that extend from diaphragm base 28'. In the example shown in FIG. 4A, raised extensions 75 are arranged in a pattern of parallel strips. An end of each raised extension 75 distal to diaphragm base 28' includes a conducting cap 74. For example, each conducting cap 74 may include a conducting material, such as a conducting metal. Typically, the conductance of a conducting cap 74 is greater than the conductance of diaphragm base 28' or of a raised extension 75. Two or more conducting caps 74, for example end conducting caps 74a and 74b, may be connected to a connector or to an electrical circuit. When the flow rate is less than a threshold value, diaphragm base 28' is approximately flat or only slightly bent. Thus, conducting caps may be electrically isolated from one another (as shown in FIG. 4A). For example, diaphragm base 28' or raised extensions 75 may include an electrically insulating, or poorly conducting, material. For example, an electrical circuit connected to end conducting caps 74a and 74b may indicate a high electrical resistance between end conducting caps 74a and 74b.

FIG. 4B shows a cross section of the diaphragm shown in FIG. 4A when the flow rate is greater than the threshold value. For example, a distending force caused by a fluid flow may cause diaphragm base 28' to bend. The bending of diaphragm base 28' may cause each conducting cap 74 to make electrical contact with an adjacent conducing cap 74. Thus, the electrical resistance between end conducting caps 74a and 74b may drop significantly. For example, an electrical circuit connected to end conducting caps 74a and 74b may indicate a low electrical resistance between end conducting caps 74a and 74b.

For example, a circuit that may connect to end conducting caps 74a and 74b may be configured to act as a switch. For example, binary diaphragm 72 may be connected to a circuit that controls a shutoff valve so as to close the valve when the flow rate exceeds the threshold value.

A diaphragm may be configured to enable measurement of a plurality of discrete flow states. For example, a circuit connected to binary diaphragm 72 may be configured to distinguish between different electrical resistance states that result when different numbers of conducting caps 74 are in contact with one another.

Figure 4C:
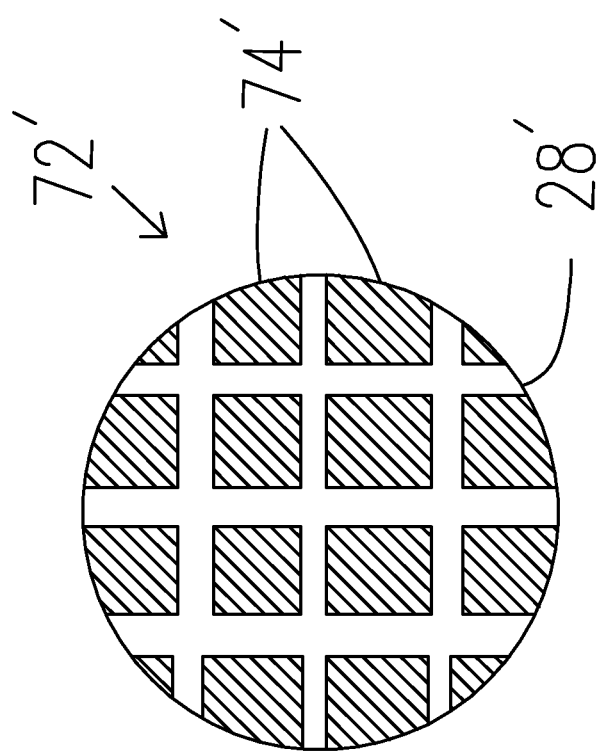
FIG. 4C shows a diagram of the surface of a diaphragm of a discrete flowmeter, in accordance with some embodiments of the present invention.

As another example, a diaphragm may include a two-dimensional array pattern of extensions with conducting caps. FIG. 4C shows a diagram of the surface of a diaphragm of a discrete flowmeter, in accordance with some embodiments of the present invention. In contrast with the parallel strip pattern of conducting caps 74 shown in FIG. 4A, conducting caps 74' of discrete flowmeter diaphragm 72' are arranged in a checkered array pattern. Thus, bending of diaphragm base 28' by differing amounts may bring various combinations of conducting caps 74' into contact with one another. Different patterns of mutual contact among conducting caps 74' may result in discrete electrical resistance values between two or more electrodes connected to conducting caps 74'. An appropriate electrical circuit connected to two or more of conducting caps 74' may be used to detect the electrical resistance. Asymmetric elastic properties of diaphragm base 28', or varying electrical conductance values among conducting caps 74', may enhance the detectability of the various states.

Alternatively, the diaphragm may be replaced by any other device capable of being displaced in response to a pressure difference and of being restored to its original configuration in the absence of such a pressure difference. For example, the diaphragm may be replaced with an appropriately configured combination of a plunger and a restoring spring, elastic band, magnet, hydraulic device, movable barrier or partition, strain gauge, or any other suitable restoring device known in the art. A flowmeter incorporating such a plunger may include an appropriate displacement measurement device, as is known in the art. For example, such as a displacement measurement device may include an appropriate mechanical, hydraulic, optical, acoustic, or electromagnetic measurement device.

Figure 5A:
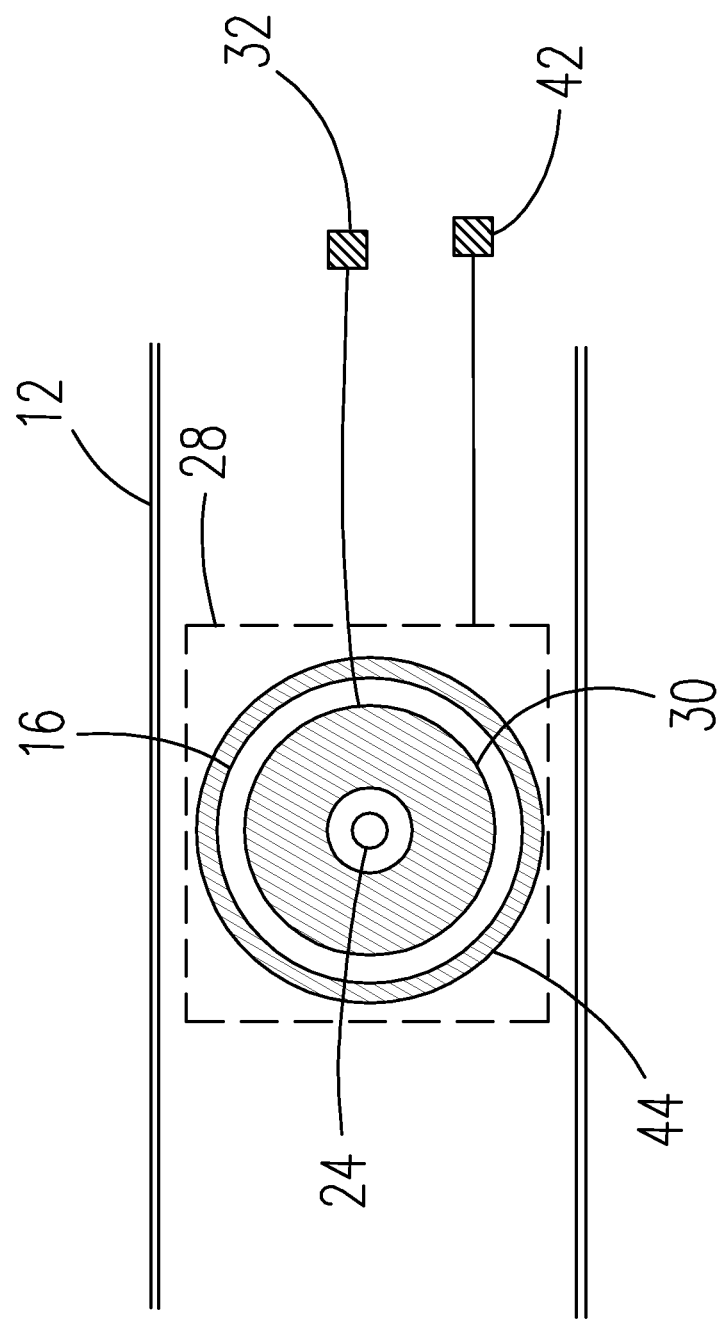
FIG. 5A shows a top view of a constricting indentation of a fluid conduit tube of a flowmeter in accordance with an alternative embodiment of the present invention.
Figure 5B:
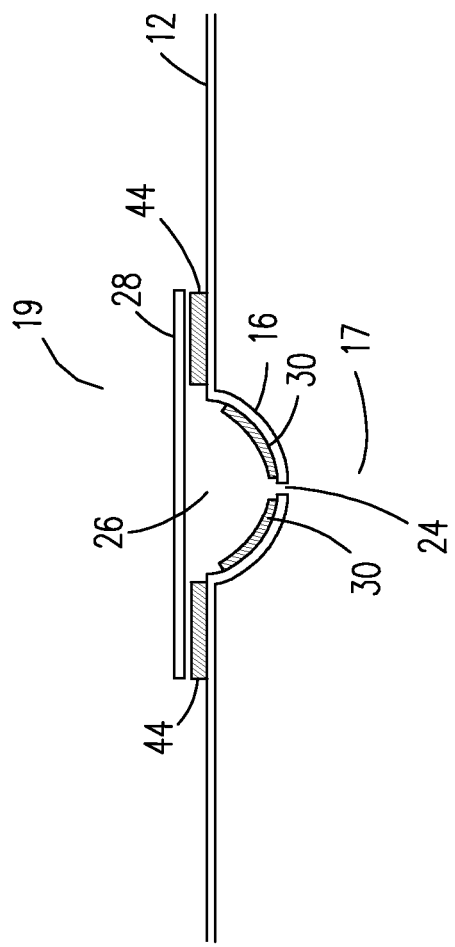
FIG. 5B shows a diaphragm and constricting indentation of the flowmeter shown in FIG. 5A, when the flow rate is close to zero.

Alternatively, an electrode and diaphragm of a flowmeter in accordance with an alternative embodiment of the present invention may be configured to vary a measurable capacitance in accordance with a fluid flow rate. FIG. 5A shows a top view of a constricting indentation of a fluid conduit tube of a flowmeter in accordance with an alternative embodiment of the present invention. FIG. 5B shows a diaphragm and constricting indentation of the flowmeter shown in FIG. 5A, when the flow rate is close to zero. Electrode 30 is located so as to surround, or at least partially surround, hole 24 in indentation cavity 26 of fluid conduit tube 12. Electrode 30 is connected to electrical connector 32. Diaphragm 28, covering indentation cavity 26, is electrically isolated from electrode 30 by electrical insulator 44. Diaphragm 28 is connected to electrical connector 42.

Typically, a variable capacitance configuration of diaphragm 28 and electrode 30 forms an electrical capacitor that may be characterized by a capacitance. Typically, the capacitance changes when the distance between diaphragm 28 and electrode 30 changes. For example, as discussed above, a flow of fluid through fluid conduit tube 12 may cause diaphragm 28 to bulge in the direction of electrode 30. Typically, diaphragm 28 and electrode 30 may be configured so as to prevent direct electrical contact between diaphragm 28 and electrode 30. For example, diaphragm 28 may be constructed of a material whose elastic properties limit stretching of diaphragm 28 so as not to touch electrode 30. Similarly, constricting indentation 16 and electrode 30 may be shaped so as to prevent diaphragm 28 from touching electrode 30. The bulging of diaphragm 28 may cause the capacitance of diaphragm 28 and electrode 30 to change. The change may be detected by an appropriate electrical circuit. For example, electrical connectors 32 and 42 may be connected to an electrical circuit that generates a signal that depends on the capacitance. For example, a measurable voltage or current of the electrical circuit may change in response to bulging or relaxation of diaphragm 28. Both diaphragm 28 and electrode 30 may be coated with an insulating material. An insulating material may, for example, inhibit discharging of the resulting capacitor by a conducting fluid that may be present in indentation cavity 26 or in interior reference space 19.

A variable capacitance configuration may, alternatively or in addition, enable a vibration analysis. For example, diaphragm 28 may vibrate in a manner dependent on, for example, properties of the fluid, the fluid flow (e.g. turbulence), and the diaphragm characteristics. Connection of the electrical connectors 32 and 42 to an appropriately configured electrical circuit may enable measurement of the vibrations. Appropriate analysis of the measured vibrations may yield additional information. For example, the analysis may yield a characterization of a complex flow (e.g. of a biological or air-conditioning system).

Alternatively, a change in shape of diaphragm 28 may be detected by other means. For example, an optical, acoustic, or electromagnetic sensor may sense a change in curvature or position of diaphragm 28. As another example, a mechanical position detector or force meter may detect a change in shape, or a change in the elastic forces exerted by, diaphragm 28. Application of a calibration technique may correlate a detected change in shape, position, or exerted force to a rate of flow.

Figure 6:
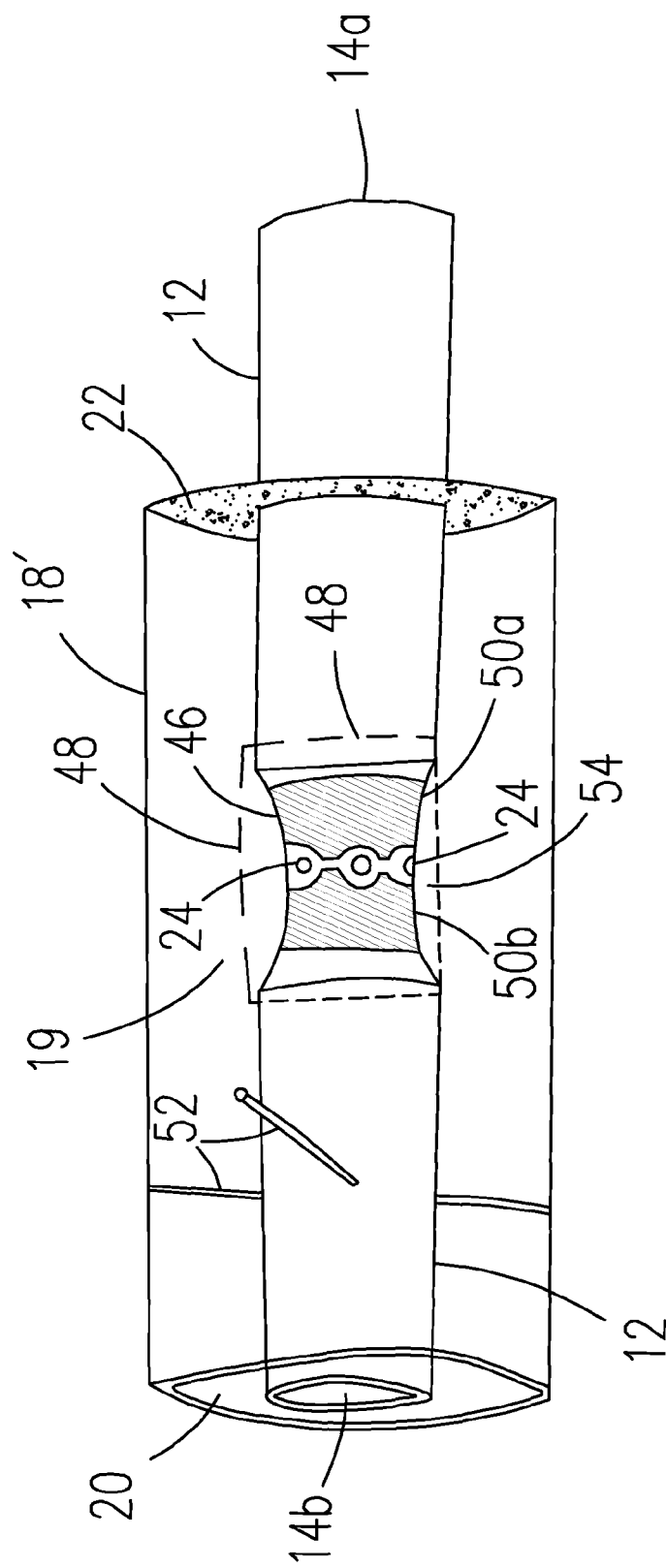
FIG. 6 shows a flowmeter with a coaxial tube configuration, in accordance with some embodiments of the present invention.

Alternatively to the configuration described above, in which a reference tube is attached adjacently to the fluid conduit tube, a coaxial configuration of the tubes is possible. FIG. 6 shows a flowmeter with a coaxial tube configuration, in accordance with some embodiments of the present invention. Coaxial reference tube 18' is arranged outside of, and coaxially to, fluid conduit tube 12. (Coaxial reference tube 18' is shown as transparent for the sake of the illustration.) As in the previous embodiments, external opening 20 of coaxial reference tube 18' may open to an output cavity together with open end 14b of fluid conduit tube 12. Typically, end 22 of coaxial reference tube 18' is closed. Alternatively, coaxial reference tube 18' may enable a flow of fluid parallel to that in fluid conduit tube 12.

Coaxial reference tube 18' may be provided with one or more spacers 52 to maintain a desired spacing between coaxial reference tube 18' and fluid conduit tube 12. Alternatively or in addition, a closed end 22 of coaxial reference tube 18' may be constructed so as to maintain the spacing. For example, closed end 22 may be constructed with a material of sufficient thickness and stiffness to maintain the spacing.

Fluid conduit tube 12 includes constricting neck 46. At constricting neck 46, the cross sectional area of fluid conduit tube 12 is reduced. Constricting neck 46 extends circumferentially around at least a portion of the perimeter of fluid conduit tube 12. For example, constricting neck 46 may be axially symmetric, as shown in FIG. 6.

Constricting neck 46 is surrounded by sleeve 48 (shown as transparent for convenience of illustration). Typically, sleeve 48 is constructed of a flexible elastic material that includes material that is at least partially electrically conducting. For example, sleeve 48 may include conducting silicone. Sleeve 48 wraps around constricting neck 46 so as to form space 54. Holes 24 in constricting neck 46 connect the interior of fluid conduit tube 12 with space 54. The outer surface of constricting neck 46 may include one or more electrodes, such as electrodes 50a and 50b. For example, electrodes 50a and 50b may be electrically isolated from one another.

When a fluid flows with a nonzero flow rate through fluid conduit tube 12, fluid dynamic forces may cause a central portion of sleeve 48 to be sucked inward into space 54 toward holes 24. The inward sucking of sleeve 48 may bring sleeve 48 into contact with electrodes 50a and 50b. Typically, the greater the rate of flow, the greater the area of contact between sleeve 48 and electrode 50a or 50b. Contact between sleeve 48 and electrodes 50a and 50b may result in an electrical connection between electrodes 50a and 50b that is characterized by an electrical resistance. The electrical resistance may typically be a function of the area of contact between sleeve 48 and electrode 50a or 50b. Since the area of contact is typically a function of flow rate through fluid conduit tube 12, the electrical resistance may be correlated with the flow rate through application of an appropriate calibration procedure. Thus, electrodes 50a and 50b may be connected to an appropriate electrical circuit (such as the Wheatstone bridge circuit shown in FIG. 3) to enable measurement of the resistance, and thus, of the flow rate.

Alternatively, electrodes 50a and 50b may be replaced by a single electrode (or may be shorted together to effectively form a single electrode), and an electrode connected to sleeve 48, so as to form a capacitor. The capacitance of the formed capacitor may vary with the shape of sleeve 48, and thus with the flow rate. Thus, measurement of the capacitance using an appropriate electrical circuit, typically following an appropriate calibration procedure, may provide a measurement of the flow rate. Alternatively, a shape or other property of sleeve 48 that may be correlated with a flow rate may be measured using an appropriate mechanical, optical, acoustic, or electromagnetic technique.

Alternatively, a central reference tube may be located within a surrounding coaxial fluid conduit tube. In this case, the surface of the central reference tube may bulge outward and one or more connecting holes located on the bulge. A sleeve may be located internally to the central reference tube at the bulge.

Figure 7:
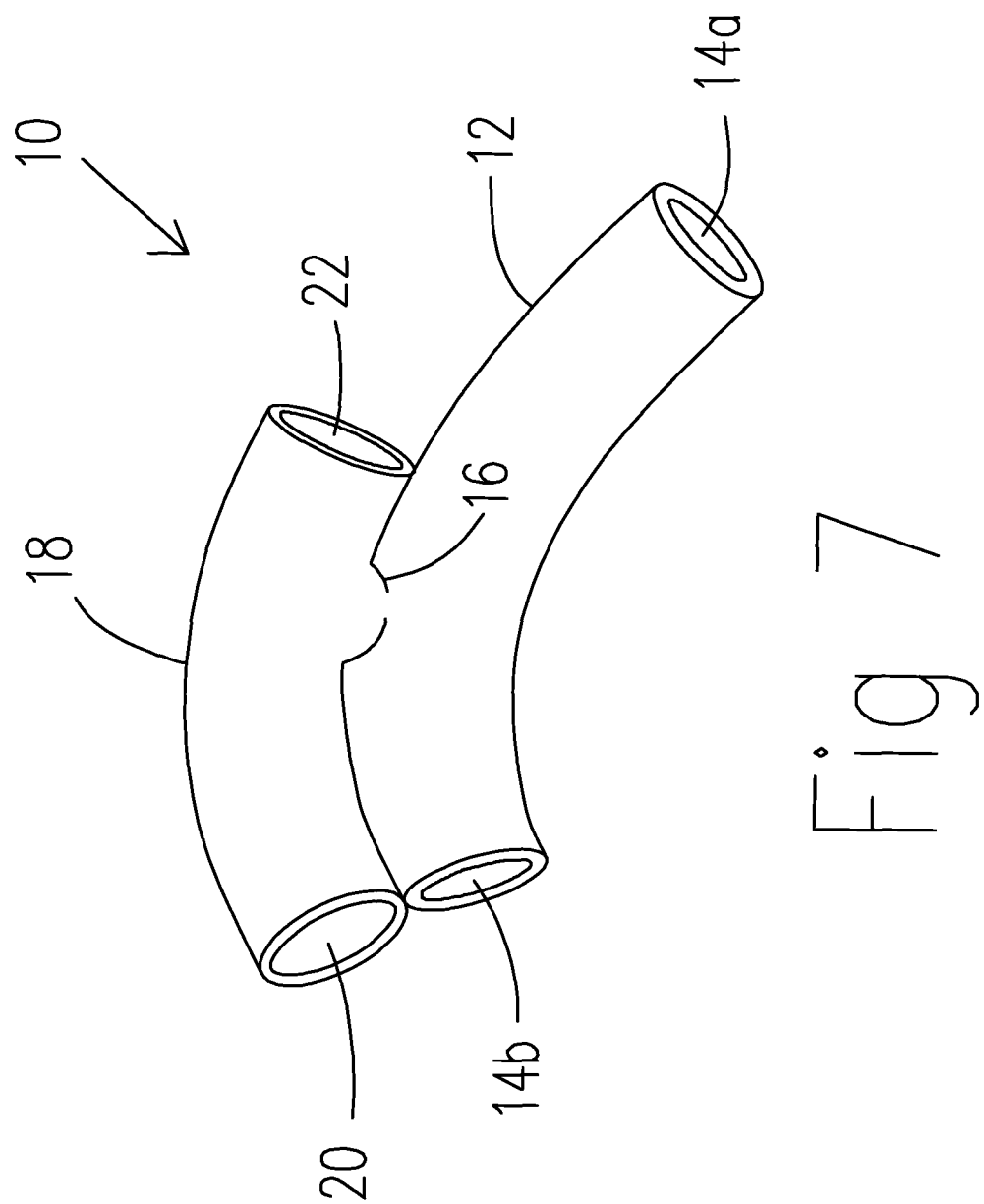
FIG. 7 shows a bent flowmeter in accordance with some embodiments of the present invention.

A flowmeter in accordance with some embodiments of the present invention may be bent. Alternatively, a flowmeter may be constructed of flexible materials, enabling the flowmeter to bend. For example, a flowmeter may be bent in order to accommodate to a space in which the flowmeter is to be placed. FIG. 7 shows a bent flowmeter in accordance with some embodiments of the present invention. As in the embodiments described above, the shape of a diaphragm (not visible in FIG. 7) at constricting indentation 16 of fluid conduit tube 12 may indicate the flow rate of a fluid through fluid conduit tube 12. Thus, detection of the shape of the diaphragm by a suitable sensor as described above may indicate the flow rate. When flowmeter 10 is bent as shown, the forces on the diaphragm may be augmented by centrifugal forces. Augmenting the forces may increase the sensitivity of flowmeter 10.

Figure 8:
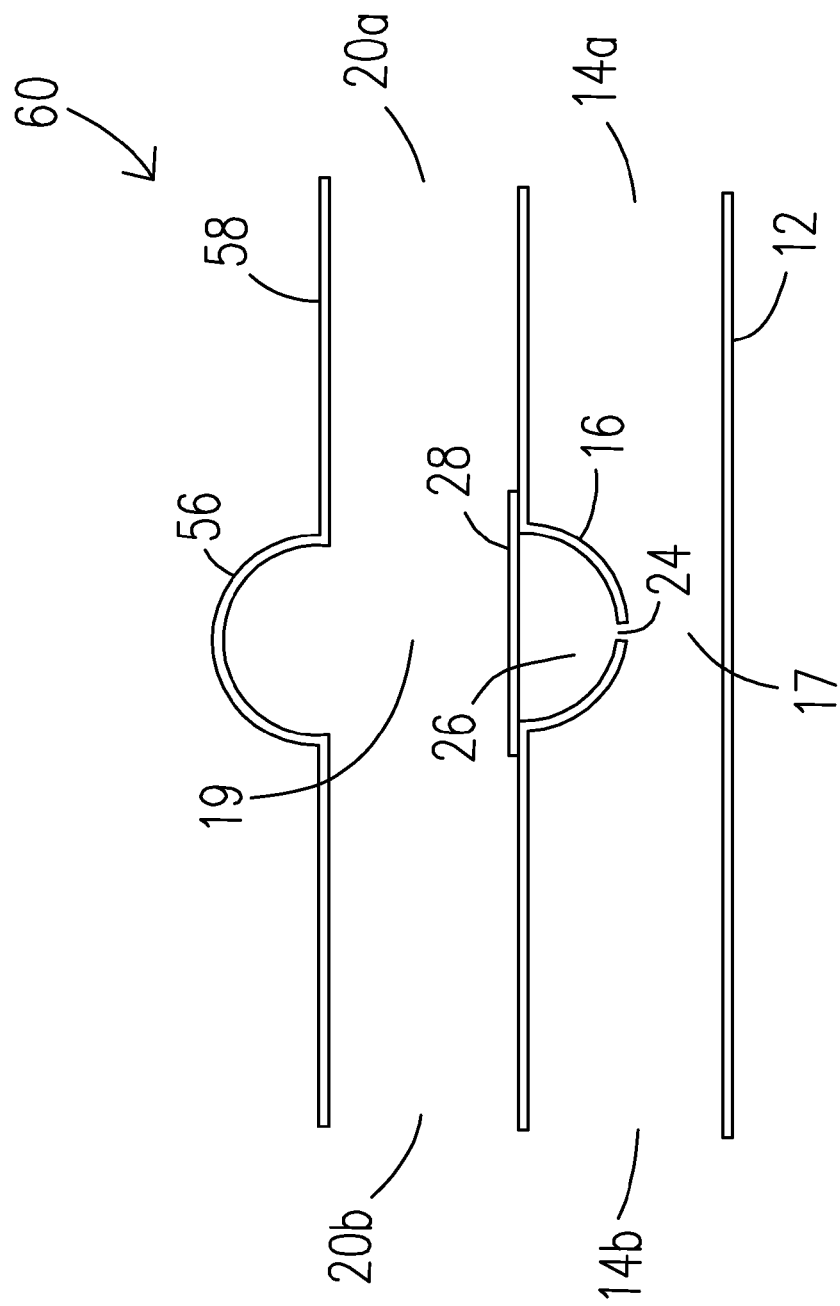
FIG. 8 shows a cross sectional view of a flowmeter with a fluid conduit that serves as a pressure reference.

In accordance with some embodiments of the present invention, a fluid conduit may serve as a reference space at a reference fluid pressure. FIG. 8 shows a cross sectional view of a flowmeter with a fluid conduit that serves as a pressure reference. Reference conduit 58 of flowmeter 60 includes two open ends 20a and 20b. Fluid may flow through reference conduit 58 in parallel to fluid flowing through fluid conduit tube 12 of flowmeter 60. For example, part of fluid that enters flowmeter 60 from a fluid input source may be diverted via fluid conduit tube 12, and part through reference conduit 58.

As described above, fluid pressure in constricted neck 17 of fluid conduit tube 12 typically is reduced relative to fluid pressure within reference space 19 of reference conduit 58. Such a reduction in flow rate may cause a change in the shape of diaphragm 28. Thus detection of such a change in the shape of diaphragm 28 may be correlated with a change in flow rate, thus serving as an indication of flow rate.

Fluid pressure differences between constricted neck 17 and reference space 19 may be enhanced by further increasing the pressure in reference space 19. For example, the walls of reference conduit 58 may include a protruding bulge 56 located at a position parallel to the position of constricting indentation 16 of fluid conduit tube 12. For example, protruding bulge 56 may be an elongated protrusion that at least partially surrounds reference conduit 58 perpendicularly to the longitudinal axis of reference conduit 58. Thus, reference space 19 is located adjacent to protruding bulge 56. The cross-sectional area of reference conduit 58 at reference space 19 is thus larger than at other positions within reference conduit 58. In accordance with aforementioned principles of fluid dynamics, fluid pressure in reference space 19 may thus be greater than at other positions within reference conduit 58.

In accordance with embodiments of the present invention, two or more flowmeters may be incorporated into a single system of interconnected fluid conduits. For example, a fluid conduit may branch into two or more branches so as to distribute a fluid from a single input source to several different output destinations. Each such branch may incorporate a flowmeter, including a constricted neck and a reference tube or conduit. In addition, measurement results from several flowmeters may be combined (e.g. by averaging) to yield a single measurement result. Such a result may be more accurate and reproducible than a measurement by a single flowmeter.

A flowmeter in accordance with embodiments of the present invention may be incorporated in a fluid flow system. For example, a flowmeter may be incorporated in an air-conditioning or refrigeration system, an irrigation system, a water distribution system, or a wastewater system. A flowmeter may be incorporated into production equipment, such as in the food production or chemical industries. A flowmeter may be incorporated into a biological system to measure, for example, blood flow or respiration.

The configuration of a flowmeter in accordance with embodiments of the present invention may be configured for a particular application. For example, diaphragm properties, including, for example, size, shape, material, elasticity, permeability, electrical conductivity, resistance to chemical or biological agents or materials, or durability, may be adapted to the measurement conditions. Such conditions may include, for example, expected fluidic properties, expected flow rate range, temperate, chemical and other environmental conditions, required time resolution and measurement accuracy, and the period of time for which the flowmeter is expected to operate. For example, a gas-liquid selective diaphragm may be used in the presence of a fluid containing a mixture of gas and liquid.

For example, a flowmeter in accordance with some embodiments of the present invention may include two or more diaphragms. For example, each diaphragm may be configured for measurement of a different range of flow rates, or for a different type of fluid.

As another example, a flowmeter in accordance with embodiments of the present invention may be used to measure the homogeneity of a solution. For example, the flowmeter may include a semi-permeable diaphragm, and the flowmeter may be configured such that the fluid conduit tube and the reference tube open to different parts of a container containing the solution. In this case, the distending forces on the diaphragm may be a function of homogeneity of the solution, as well as the fluid flow rate through the fluid conduit tube.

A flowmeter in accordance with embodiments of the present invention may be incorporated into a device for monitoring the flow of milk during breastfeeding.

Figure 9:
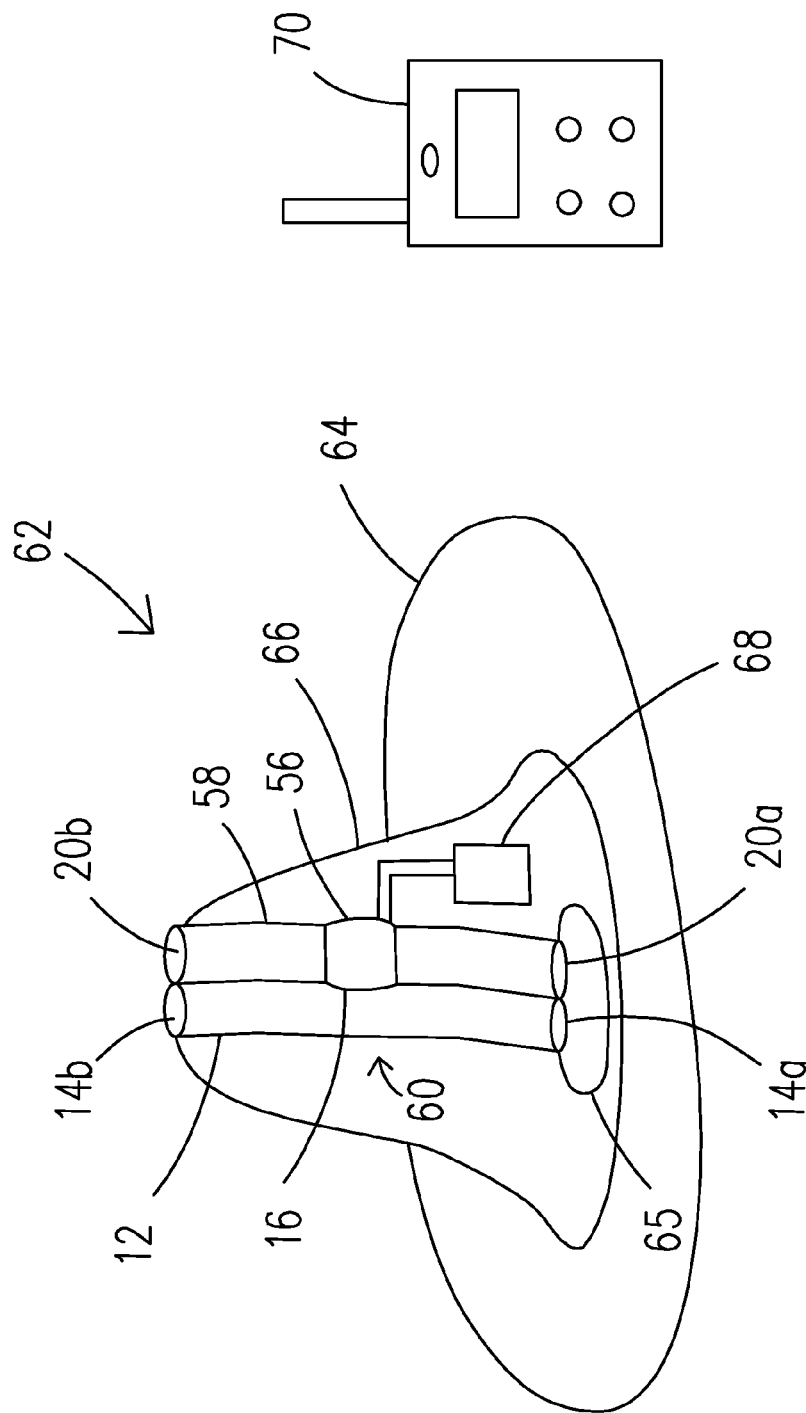
FIG. 9 shows a breastfeeding monitor device in accordance with some embodiments of the present invention.

FIG. 9 shows a breastfeeding monitor device in accordance with some embodiments of the present invention. Milk flowmeter 62 includes a breast shield 64. Breast shield 64 is designed to fit over the breast of a nursing woman such that nipple adapter 65 fits over the nipple of the breast. Artificial nipple 66 is design to fit into the mouth of a nursing baby. Thus, when the baby sucks on artificial nipple 66, milk flows from nipple adapter 65 through artificial nipple 66 into the baby's mouth. Artificial nipple 66 is provided with a flowmeter in accordance with embodiments of the present invention for measuring the flow of milk through artificial nipple 66. The flowmeter may be in accordance with any of the flowmeter embodiments described above. For example, artificial nipple 66 may incorporate a flowmeter 60 with fluid conduit tube 12 and reference conduit 58. Thus, milk may enter fluid conduit tube 12 at open end 14a and exit at open end 14b. In parallel, milk may enter reference conduit 58 at external opening 20a and exit at external opening 20b.

As described above, the shape of a diaphragm (not visible in FIG. 9) at constricting indentation 16 may be determined as a function of flow rate. Also as described above, the shape of the diaphragm may be sensed by an appropriate sensor (not shown) positioned near constricting indentation 16. The sensor may be connected to sensor circuit 68. For example, sensor circuit 68 may include an appropriate circuit for measuring an electrical property (e.g. resistance or capacitance) associated with the sensor, or an output signal generated by the sensor. Sensor circuit 68 may also include a power source for providing electrical power to the sensor.

Sensor circuit 68 may be provided with a processor for converting a sensor reading to a flow rate. Alternatively, sensor circuit 68 may be provided with a device for transferring data to an external controller 70. For example, sensor circuit 68 may include a transmitting device for transmitting data to external controller 70. Alternatively, sensor circuit 68 may include a data storage device and an appropriate connector for connection to external controller 70. For example, during breastfeeding, sensor circuit 68 may store data. When breastfeeding is complete, sensor circuit 68 may connect to external controller 70 via the connector in order to transfer data to external controller. External controller 70 may include a processor for converting a sensed signal to a flow rate. External controller 70 may include a timing device. For example, a flow rate and a time may be processed to yield a total quantity of milk that flowed through milk flowmeter 62 during breastfeeding. External controller 70 may include one or more control devices for controlling milk flowmeter 62. Such controls may include an on/off function or a reset function.

A flowmeter in accordance with some embodiments of the present invention may incorporate a barrier or valve through which a fluid may seep at a seep rate that depends on a flow rate of a fluid through a conduit tube of the flow meter. In the presence of a fluid flow in the conduit tube, the valve may open to enable transfer of a fluid through a passageway connecting the reference tube and the conduit tube. The direction of the enabled fluid transfer may depend on the configuration of the flowmeter. For example, the reference tube may serve as a fluid receptacle for collecting fluid that seeps out of the conduit tube. As another example, fluid from an initially filled container may seep out of the container and into the conduit tube.

Figure 10:
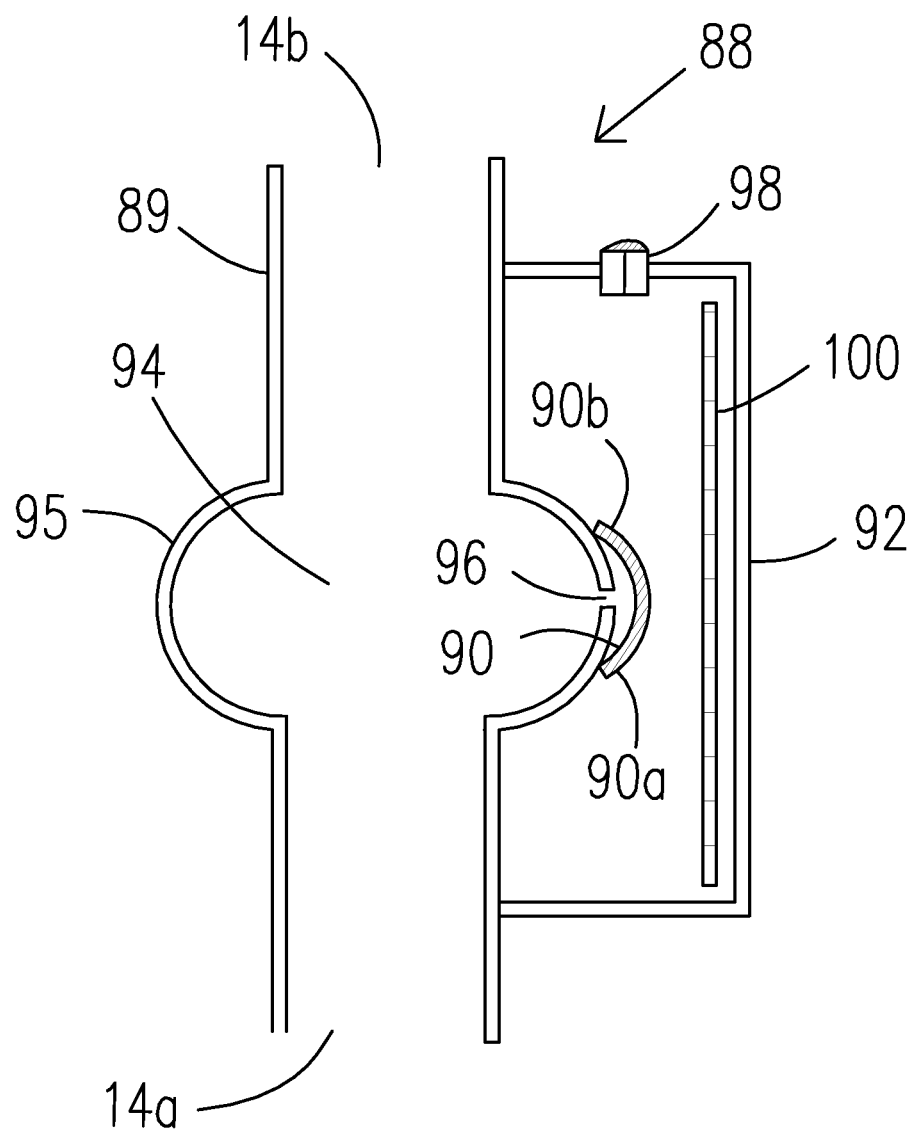
FIG. 10 shows a cross section of a seep valve flowmeter in accordance with some embodiments of the present invention.

FIG. 10 shows a cross section of a seep valve flowmeter in accordance with some embodiments of the present invention. Seep valve flowmeter 88 includes fluid conduit tube 89 and fluid receptacle 92. Fluid conduit tube 89 includes a bulge 95 forming expanded space 94. Hole 96 connects fluid conduit tube 89 with fluid receptacle 92 at bulge 95. The receptacle side of hole 95 is covered with hole cover 90. Typically, hole cover 90 is at least partially constructed of a flexible and elastic material so as to enable a slight bending of hole cover 90. For example, a fixed section 90a of the perimeter of hole cover 90 may be fixed to the outward-facing surface of fluid conduit tube 89 at bulge 95. A free section 90b of the perimeter of hole cover 90 may be free to move away from fluid conduit tube 89 under an applied force. Typically, fixed section 90a includes a greater fraction of the perimeter of hole cover 90 than does free section 90b. Typically, in the absence of an applied force pushing free section 90b away from fluid conduit tube 89, elastic restoring forces in hole cover 90 hold free section 90b against fluid conduit tube 819.

Alternatively, instead of an elastic hole cover, a seep valve flowmeter may include a lid, door, flap, valve, or similar hinged or flexible cover that is provided with a restoring element. For example, the restoring element may include a spring, elastic band, magnet, or element capable of providing a restoring force to hold the cover shut in the absence of an applied force. Alternatively, an elastic hole cover may include a slit or hole that may expand in response to a pressure difference.

In accordance with the aforementioned principles of fluid dynamics, when fluid flows through fluid conduit tube 89 with a nonzero flow rate, fluid pressure in expanded space 94 is typically greater than fluid pressure in the remainder of fluid conduit tube 89. The increased pressure may result in a net outward force on hole cover 90 and push at least part of free section 90b away from fluid conduit tube 89. When free section 90b is pushed away from fluid conduit tube 89 to form an opening, fluid may seep through the from fluid conduit tube 89 into fluid receptacle 92.

Alternatively to bulge 95, a fluid conduit tube may have a wider cross-sectional area at a fluid input end than at a fluid output end. For example, the fluid conduit tube may include a neck at which the cross-sectional area narrows. In this case, a hole connecting the fluid conduit tube with the fluid receptacle may be located upstream of the neck.

Alternatively to bulge 95, a fluid conduit tube may include a constriction. For example, a plunger or diaphragm may be configured to move in response to changes in fluid pressure resulting from a change in flow rate. The plunger or diaphragm may be mechanically connected to a moveable hole cover, for example, via an appropriate system of bars or levers. Thus, an increase in flow rate may result in an increase of the rate of seepage from a fluid conduit tube to a receptacle.

Fluid receptacle 92 may be provided with a selective valve 98. For example, selective valve 98 may include a one-way valve for enabling fluid to exit from fluid receptacle 92 while preventing fluid from entering fluid receptacle 92. For example, fluid receptacle 92 may be initially filled with air, while the flowing fluid whose flow rate is to be measured is a denser fluid. In this case, selective valve 98 may enable air to exit from fluid receptacle 92 while retaining the denser fluid inside. Fluid receptacle 92 is typically provided with a device for measuring the amount of fluid within, represented by graduated tube 100. For example, graduated tube 100 may represent a graduated cylinder, a graduated rod or dipstick, a scale for measuring the weight of the fluid, or any other optical, acoustic, electromagnetic, or mechanical device known in the art for measuring the quantity (e.g. volume or weight) of a fluid contained in a receptacle.

For example, seep valve flowmeter 88 may be used in conjunction with a timer to measure a flow rate. Calculation of the flow rate may be manual or automatic. For example, the difference in volume of fluid in fluid receptacle 92 at the beginning and end of a predetermined may be correlated with a flow rate of the fluid through fluid conduit tube 89.

For example, a milk flowmeter (similar to milk flowmeter 62 shown in FIG. 9) may incorporate a seep valve flowmeter. For example, a conduit of the milk flow meter may include a seep valve that enables milk to enter a graduated receptacle tube at rate that may be correlated with a milk flow rate. The graduated receptacle may be positioned so as to be visible to an observer looking at the milk flowmeter.

Figure 11:
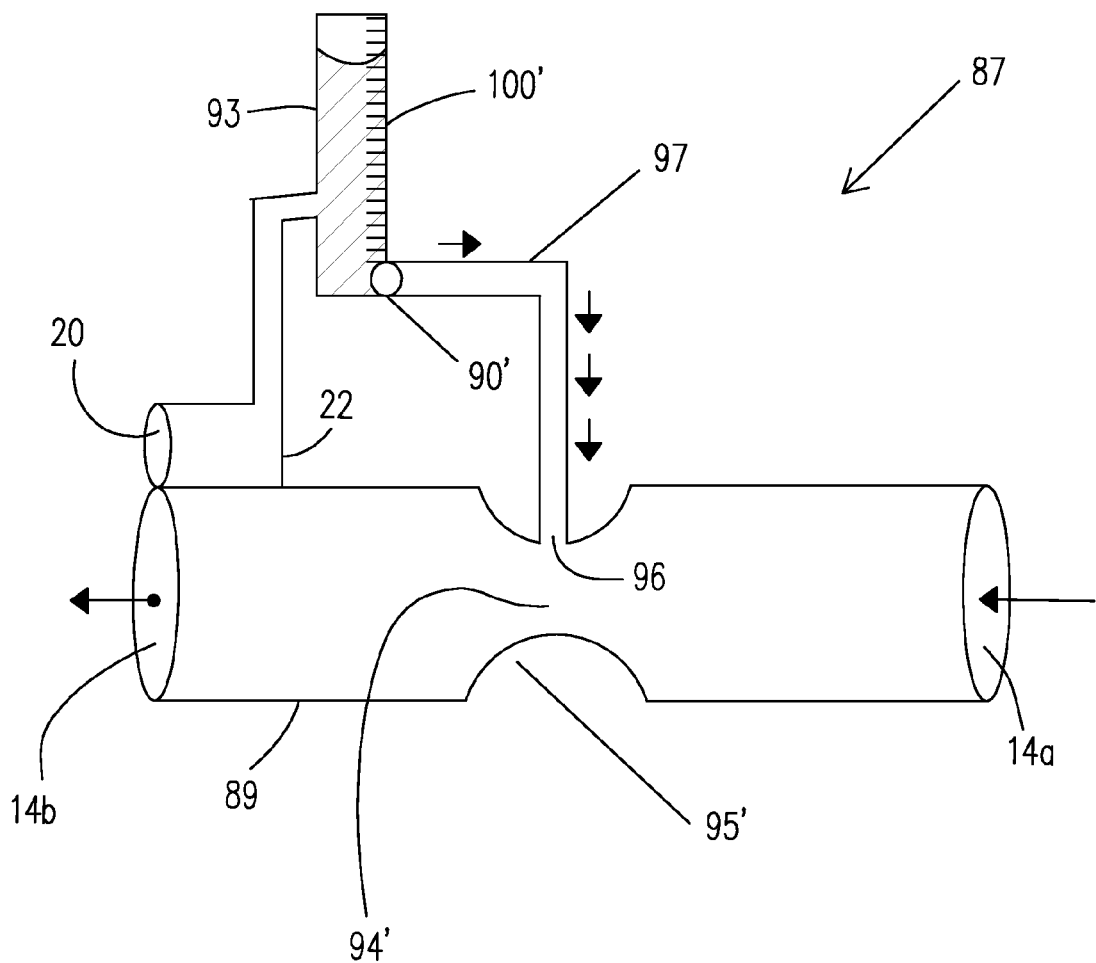
FIG. 11 shows an alternative seep valve flowmeter in accordance with some embodiments of the present invention.

Alternatively, a seep valve flowmeter may be configured to enable a fluid to drain out of a fluid container in response to a flow in a fluid conduit. FIG. 11 shows an alternative seep valve flowmeter in accordance with some embodiments of the present invention. Alternative seep valve flowmeter 87 includes fluid container 93. For example, fluid container 93 may be initially filled with fluid prior to flow measurement. Fluid conduit tube 89 includes constricting indentation 95' that form constricted neck 94'. When a fluid flows through constricted neck 94', a difference in fluid pressure in fluid on either side of fluid barrier 90'. The difference in fluid pressure may cause fluid barrier 90' to open. For example, fluid barrier 90' may include a hinged or flexible gate that may be opened by a pressure difference. Opening fluid bather 90' may enable a fluid to drain from fluid container 93 via connecting tube 97 and opening 96 into fluid conduit 89. A difference in fluid level in fluid container 93, e.g. as measured with graduations 100', may then indicated a flow rate through fluid conduit 89. Alternatively, fluid barrier 90' may be located at opening 96. In this case, fluid container 93 may be attached directly to opening 96.

A flowmeter in accordance with some embodiments of the present invention may include a moveable indicator. For example, the moveable indicator may act as a barrier of prevent or inhibit flow in a connecting passageway or tube that connects a fluid conduit tube and a reference tube. A difference in fluid pressure between fluids on either side of the moveable indicator may cause the indicator to move. Typically, the flowmeter is configured such that the indicator moves in a single direction in response to a pressure difference induced by a flow of fluid through the fluid conduit tube. For example, the indicator may be placed inside an elastic tube. The cross-sectional area of the interior of the tube when not stretched may be slightly smaller than that of the indicator. Thus, in the absence of a pressure difference, the indicator may be held in place by the elastic tube. However, a pressure difference induced by a fluid flow may provide sufficient force so as to move the indicator. (The direction of the pressure difference may depend on the configuration of the flowmeter.) Thus, a change in the position of the indicator along the passageway may indicate a flow of fluid through the fluid conduit tube.

Figure 12A:
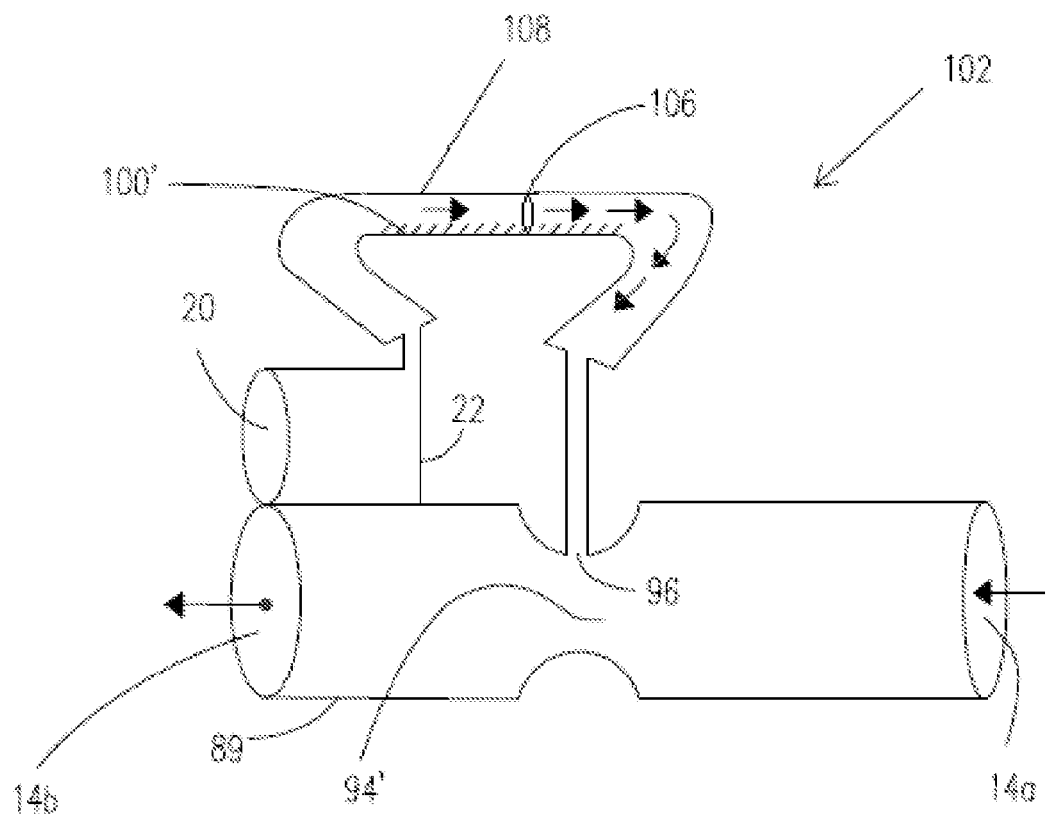
FIG. 12A shows a moveable indicator flowmeter with a constricted neck in accordance with some embodiments of the present invention.
Figure 12B:
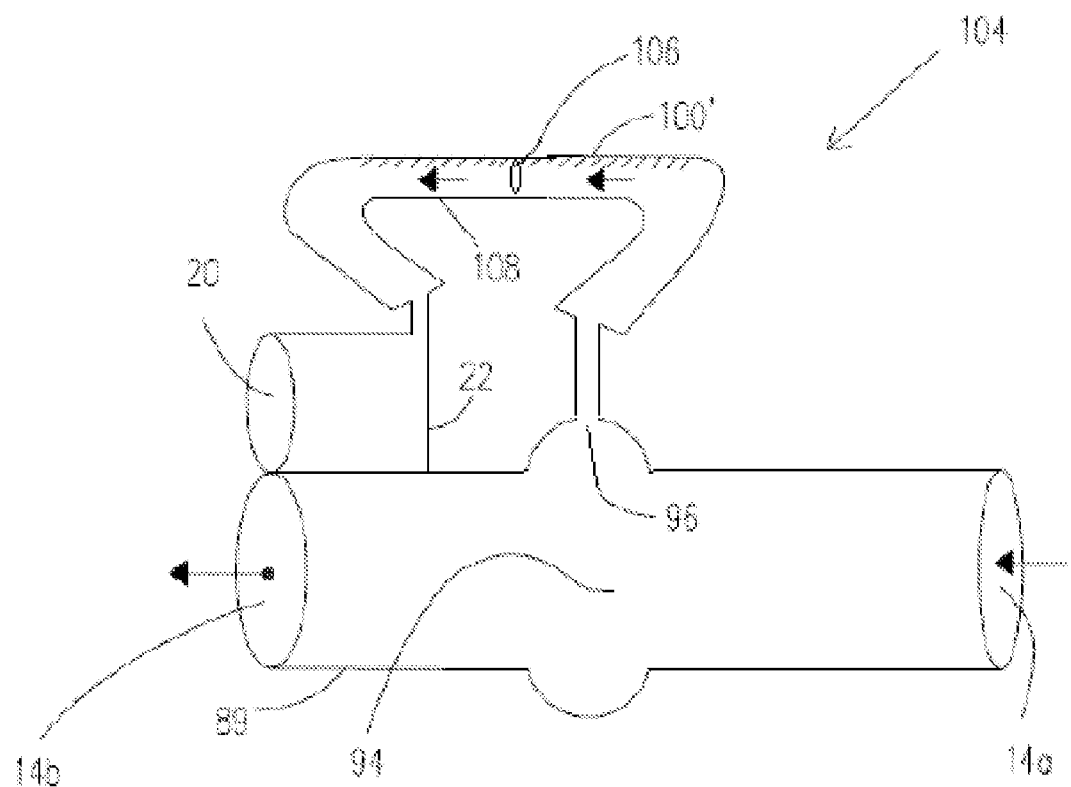
FIG. 12B shows a moveable indicator flowmeter with a protruding bulge in accordance with some embodiments of the present invention.

FIG. 12A shows a moveable indicator flowmeter with a constricted neck in accordance with some embodiments of the present invention. FIG. 12B shows a moveable indicator flowmeter with a protruding bulge in accordance with some embodiments of the present invention. Constricted neck moveable indicator flowmeter 102 and protruding bulge moveable indicator flowmeter 104 each include a moveable indicator 106. Moveable indicator 106 is located inside flexible tube segment 108. The diameter of moveable indicator 106 is greater than the diameter of flexible tube segment 108.

A fluid flow through fluid conduit tube 89 may induce a force to move moveable indicator 106 in the direction indicated by the arrows.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A flowmeter device for measuring a flow rate of a fluid, the device comprising:
    a conduit for the fluid flow, the conduit being characterized by a cross-sectional area, the conduit including at least one section within which the cross-sectional area is different from the cross-sectional area of at least one other section of the conduit;
    a reference tube separated from the conduit by a wall, the reference tube including at least one external opening to a space containing the fluid to enable the fluid to fill the reference tube from outside the conduit;
    at least one opening in the wall between said at least one section and the reference tube; and
    a flexible diaphragm forming a space between the diaphragm and a region of the wall at said at least one section, which includes the opening, to inhibit flow of the fluid between the conduit and the reference tube, the diaphragm being deformable so as to allow measuring of a parameter indicative of the deformation of the diaphragm in response to a difference between fluid pressure in said at least one section and fluid pressure in the reference tube.

2. A device as claimed in claim 1, wherein said at least one section comprises a constriction.

3. A device as claimed in claim 2, wherein the constriction comprises an indentation on a side of the conduit.

4. A device as claimed in claim 2, wherein the constriction extends circumferentially about the conduit.

5. A device as claimed in claim 2, wherein the diaphragm comprises a sleeve that surrounds the constriction.

6. A device as claimed in claim 1, wherein said at least one section is provided with at least one electrode.

7. A device as claimed in claim 6, wherein said at least one electrode comprises at least two electrodes, and wherein the measurable parameter includes electrical resistance between the electrodes.

8. A device as claimed in claim 7, comprising a Wheatstone bridge circuit for measuring the electrical resistance.

9. A device as claimed in claim 6, wherein the measurable parameter includes electrical capacitance of a capacitor at least partially formed by the diaphragm and said at least one electrode.

10. A device as claimed in claim 1, wherein the reference tube is adjacent to the conduit.

11. A device as claimed in claim 1, wherein the reference tube at least partially surrounds the conduit.

12. A device as claimed in claim 1, wherein said at least one external opening includes at least two external openings to enable the fluid to flow through the reference tube.

13. A device as claimed in claim 1, wherein the diaphragm comprises at least two electrically conducting caps, wherein electrical contact between at least two of said at least two electrically conducting caps depends on the shape of the diaphragm.

14. A device as claimed in claim 13, wherein the electrically conducting caps are arranged in a parallel strip pattern.

15. A device as claimed in claim 13, wherein the electrically conducting caps are arranged in a two-dimensional array pattern.

16. A device as claimed in claim 1, incorporated into an artificial nipple of a breastfeeding monitor apparatus.

17. A device as claimed in claim 1, wherein the conduit comprises a flow cutoff valve.

18. A device for measuring a flow rate of a fluid, the device comprising:
- a conduit for the fluid flow, the conduit being characterized by a cross-sectional area, the conduit including at least one section within which the cross-sectional area is different from the cross-sectional area of at least one other section of the conduit;
- a container;
- at least one fluid passageway between said at least one section and the container; and
- a barrier operable to inhibit flow of the fluid through the passageway, at least a part of the barrier being operable in response to a difference between fluid pressure of the fluid flow in said at least one section and fluid pressure in the container so as to enable a transfer of a measurable quantity of fluid between the conduit and the container, the measurable quantity being indicative of the flow rate.

19. A device as claimed in claim 18, wherein a wall of the container includes a one-way valve configured to enable a fluid to flow in a single direction either into or out of the container.

20. A device for measuring a flow rate of a fluid, the device comprising:
- a conduit for the fluid flow, the conduit being characterized by a cross-sectional area, the conduit including at least one section within which the cross-sectional area is different from the cross-sectional area of at least one other section of the conduit;
- a reference tube including at least one external opening to enable the fluid to fill the reference tube from outside the conduit;
- at least one fluid passageway between said at least one section and the reference tube; and
- an indicator placed within said at least one fluid passageway and configured to inhibit flow of the fluid through the passageway, the indicator being moveable by a measurable distance along the passageway in response to a difference between fluid pressure of the fluid flowing through said at least one section and fluid pressure in the reference tube.

21. A device as claimed in claim 20, wherein the passageway comprises an elastic tube.

* * * * *